United States Patent

DiLello et al.

[11] 3,855,892
[45] Dec. 24, 1974

[54] CUTTING RULE

[75] Inventors: Carmen J. DiLello, Philadelphia; David K. Hart, Rosemont, both of Pa.

[73] Assignee: Cir-Cut Corporation, Philadelphia, Pa.

[22] Filed: Mar. 7, 1973

[21] Appl. No.: 338,761

[52] U.S. Cl................... 83/835, 76/107 C, 83/347
[51] Int. Cl............................................. B26d 1/12
[58] Field of Search ............ 83/660, 673, 688, 689, 83/665, 347, 678, 835, 846, 852; 76/107 C; 93/58.4, 58 P

[56] References Cited
UNITED STATES PATENTS

| 92,600 | 7/1869 | Gaston | 83/660 |
|---|---|---|---|
| 3,119,312 | 1/1964 | Henc | 76/107 C UX |
| 3,293,962 | 12/1966 | Gianaris | 93/58.4 UX |
| 3,383,969 | 5/1968 | Saunders | 76/107 C X |

FOREIGN PATENTS OR APPLICATIONS

| 522,138 | 6/1940 | Great Britain | 83/852 |

Primary Examiner—Frank T. Yost
Attorney, Agent, or Firm—Edelson and Udell

[57] ABSTRACT

A cutting rule for rotary die cutting apparatus having an asymmetric sawtooth cutting edge in which the depth of the crotch between adjacent teeth is substantially less than half the distance between adjacent teeth tips and the crotch is located longitudinally closer to one of the tooth tips than to the other of the pair of teeth between which it lies. The cutting rule stock is provided with front and back pre-bevels, and the tooth-cutting grinder moves transversely across the rule stock at approximately a 30° angle. The asymmetric sawtooth cutting rule effects a reduction in the required applied cutting force of approximately forty percent and reduces cutting penetration into the anvil cover by about the same amount resulting in extended life of the diecutting equipment.

21 Claims, 6 Drawing Figures

PATENTED DEC 24 1974 3,855,892

CUTTING RULE

This invention relates generally to cutting rule used in the fabrication of rotary dies for cutting and blanking material in sheet or web form. More particularly, this invention relates to an improved cutting rule which achieves cutting with reduced applied force as compared to known types of cutting rule, and which significantly increases the useful life of the diecutting equipment.

In cutting corrugated boxboard and other paperboard products by means of rotary diecutting machinery, the cutting rule or blade of desired configuration is held by various means to the cylindrical outside surface of a diecutting cylinder, which latter when in operation is continuously rotated about the longitudinal cylindrical axis of the diecutting cylinder. Adjacent and parallel to the diecutting cylinder in a position usually either directly below or above the latter is another cylinder which is referred to as the anvil cylinder. The anvil cylinder is provided with a removable cylindrical cover made of an elastomeric material. With both the diecutting and anvil cylinder rotating synchronously, the material to be diecut is passed therebetween in the direction of cylinder rotation, and the cutting rule passes through the material and penetrates the elastomeric cover of the anvil cylinder as the rotating die passes through the nip of the cylinders.

The cutting action of the die blade is a combination of shear and punch and requires that the blade pass completely through the material being cut in order to provide complete severance. This necessarily requires that the cutting rule pass at least partly into the elastomeric cover so that the cover acts as a female die for the edge of the cutting blade. A typical rotary diecutting apparatus of the type described is illustrated in U.S. Pat. No. 3,119,312 assigned to the assignee of the present invention.

The nature of rotary diecutting is such that the cutting force generated is radially directed with respect to the cutting and anvil cylinders and is maximum in the plane in which the axes of both cylinders are disposed. The radial forces required to force the cutting rule through the material being cut and to penetrate the elastomeric cover to effect cutting can be quite considerable, and for a given type of material, such as corrugated boxboard, the cutting force required varies with the type of cutting rule which is employed. For example, the blade load in pounds per lineal inch of cutting blade may vary by a ratio of 2½ to 1 while the penetration into the elastomeric cover may vary in a ratio of almost 2 to 1 when different types of cutting blade are used to cut through exactly the same piece of boxboard.

A survey article of the state of the art in cutting rule by David K. Hart entitled "Steel Rule for Rotary Die Cutting Of Corrugated" appeared in the May/June, 1972 issue of "Diemaking, Diecutting and Coverting," the article covering tests made with serrated rule, scalloped rule, and flat rule, with various kinds of bevels imparted to the cutting edges As shown in table 1 of that article, with a given material to be cut and with and anvil cover of Shore 83A hardness polyurethane, the blade load in pounds per inch of cutting rule varied from 96 pounds to 233 pounds while the anvil cover penetration varied from 75 mils to 125 mils, all as a function of the type of cutting rule employed to make the cut. The new type of cutting rule made according to the present invention results in blade load force reductions below the reported minimum of the order of 40 percent so that the mechanical stresses to which the entire cutting mechanism is subjected is drastically reduced.

Additionally, when the cutting rule penetrates the elastomeric cover in order to complete the cut through the material, the cover is damaged to a degree even though very tough materials, such as polyurethane, are used as the anvil cover material. Anvil cover life and replacement costs are an important economic factor in the diecutting process. Tests have shown that the new cutting rule according to this invention reduces the penetration required to cut typical boxboard by approximately 30 to 40 percent when running against a polyurethane anvil cover having a hardness of about Shore 81A durometer.

Known types of cutting rule whether of the single bevel or double bevel type cannot be used effectively with anvil covers having significantly greater hardness because the load required to force the rule into harder anvil covers becomes excessive. The new cutting rule according to the invention by virtue of its greatly reduced penetration requirement can be used with anvil covers having a Shore durometer of 90A. With a cover of this hardness, penetration requirement is on the order of only one-third of that required for the best of the conventional systems. The reduced anvil cover penetration requirement substantially improves the life of the anvil cover.

Prior to the present invention, there were three major types of cutting rule, a knife edge type, a type having a cutting edge best described as scalloped, and a third most commonly encountered type of rule known as serrated rule. The serrated rule has symmetrical teeth, and prior to the rule according to the invention has generally been the cutting rule of perference. This is so despite the fact that in some cases the penetration of the anvil cover is less with a double bevel flat rule than with the serrated rule because even though the flat rule required lesser penetration, it caused paper dust to be packed into the cuts in the anvil cover causing cover distorting blisters at the ends of cuts. The serrated rule, although penetrating deeper into the anvil cover, wiped most of the paper dust out of the penetration cuts so that the anvil cover life was substantially longer than with the shallower penetrating flat rule.

The new cutting rule according to the invention constitutes a distinctly different type of cutting rule which is best described as sawtooth. Each tooth of the new sawtooth cutting rule is asymmetric in that one edge of each tooth is longer than the other edge so that the crotch between adjacent teeth points lies closer to one tooth point than to the other. Additionally, the crotch depth of the sawtooth blade according to the invention is shallower than the crotch depth of serrated rule so that anvil cover penetration is reduced. Accordingly, it is a primary object of the invention to provide a novel cutting rule which is characterized by a substantially reduced cutting force requirement together with a reduced anvil cover penetration requirement in order to effect clean cutting in rotary diecutting apparatus.

Another object of the invention is to provide a novel cutting rule as aforedescribed wherein the cutting edge is in the form of an asymmetric sawtooth configuration.

Yet another object of the invention is to provide a novel cutting rule as aforementioned wherein the inter-teeth crotch depth is substantially shallower than in previous types of serrated cutting rule.

A further object of the invention is to provide a novel cutting rule edge configuration which materially increases anvil cover life.

The foregoing and other objects of the invention will become clear from a reading of the following specification in conjunction with an examination of the appended drawing, wherein.

In the several figures, like elements are denoted by like reference characters.

Figure 6:
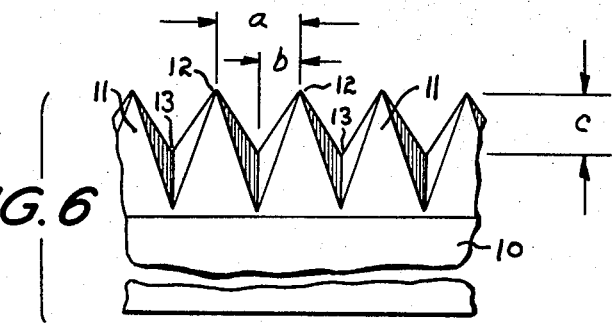
FIG. 6 is an enlarged fragment of several teeth from the serrated type of cutting rule and is illustrative of the prior art.

Referring now to the drawings, the showing of FIG. 6 illustrates the type of prior art rule known as sideface serrated rule designated generally as 10. This type of cutting rule has symmetrical teeth 11 with tips 12 and crotches therebetween designated as 13. The tooth-to-tooth spacing is designated by the letter $a$, the tooth-tip to tooth-crotch spacing is designated by $b$, and the crotch depth (distance from the teeth peaks to the maximum depth between teeth) is designated by lower case $c$. In this type of rule, $b = a/2$ and $c$ is a substantial function of $a$, as for example 75 percent to more than 100 percent of the tooth pitch $a$. In this type of rule, the tips 12 have to be driven relatively deeply into the anvil cover before the crotches 13 of the teeth 11 penetrate sufficiently to completely sever the product being cut.

Figure 1:
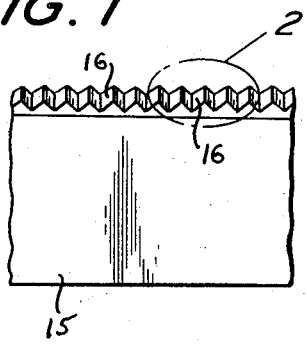
FIG. 1 is an enlarged front elevation of the new cutting rule according to the invention.
Figure 2:
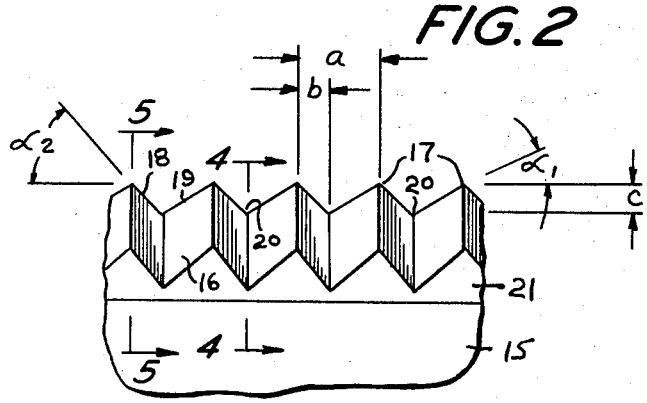
FIG. 2 is an enlarged fragment of the cutting rule of FIG. 1 illustrating more clearly several teeth of the cutting rule enclosed within the phantom circle 2 shown on FIG. 1.

Referring now to FIGS. 1 through 5, the sawtooth cutting rule according to the invention is designated generally as 15 and is provided at its upper edge with a row of teeth designated as 16. As best seen in FIG. 2, each tooth 16 has a tip 17 and two tooth edges, a shorter edge 18 and a longer edge 19. The tooth edge 18 is inclined at an angle $\alpha_2$ with respect to the line which connects the tips 17 of the teeth 16, while the tooth longer edge 19 is inclined at an angle $\alpha_1$. The crotches between the teeth are designated as 20.

Figure 4:
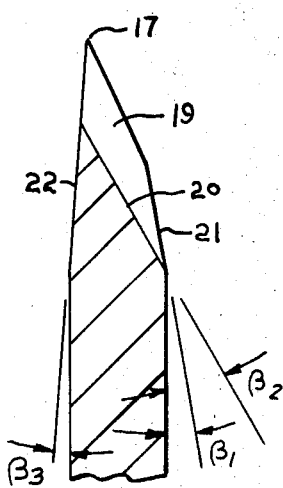
FIG. 4 is a vertical sectional view on an enlarged scale through the crotch between a pair of adjacent teeth as would be seen when viewed along the line 4—4 of FIG. 2.
Figure 5:
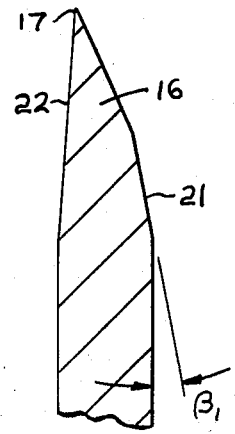
FIG. 5 is a vertical sectional view on an enlarged scale through the point of a cutting tooth as would be seen when viewed along the line 5—5 of FIG. 2.

The sawtooth rule is made by appropriately grinding the teeth 16 into a piece of straight edge cutting rule which has been provided with a front bevel surface 21 ground at an angle $\beta_1$, and a back bevel surface 22 ground at an angle $\beta_3$, these angles being seen in the showings of FIGS. 4 and 5. Typically, $\beta_1$ is on the order of 19° while $\beta_3$ is on the order of 4°. The sawtooth teeth 16 are cut into the bevelled edge of the cutting rule by the use of a tooth-cutting grinder (not shown) which moves across the bevelled edge of the cutting rule at an angle shown as $\beta_2$ in FIG. 4. In the case of the cutting rule according to the invention the angle $\beta_2$ that the tooth-cutting grinder makes to the cutting rule is 30° which results in an angle $\alpha_1$ of 18° and an angle $\alpha_2$ of 34°.

Figure 3:
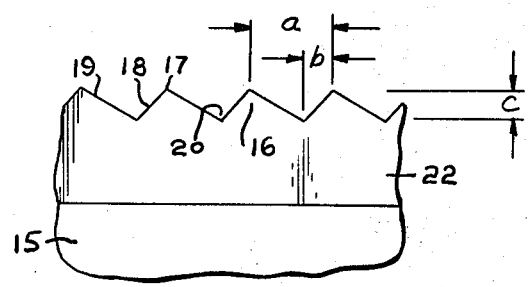
FIG. 3 is an elevation of the reverse side of the fragment of the cutting rule shown in FIG. 2.

As best seen from FIGS. 2 and 3, in the cutting rule according to the invention, the asymmetry of the tooth configuration results in a ratio of $b/a$ equal to substantially one-third, which is of course considerably different from that same ratio for the prior art serrate rule shown in FIG. 6. Additionally, the ratio of $c/a$ for the sawtooth rule according to the invention is about one-fifth, which is again considerably different from that same ratio in the serrated rule illustrated in FIG. 6.

During experimental development of the cutting rule according to the invention it was found that while reduction of tooth crotch depth would clearly reduce penetration of the anvil cover, this reduction of crotch depth was not sufficient to meet the objectives of the invention since the force required per lineal inch of cutting rule was not reduced. The desired substantial reduction in cutting force was only achieved when the tooth configuration departed from the known type of symmetrical tooth to the disclosed form of the asymmetric sawtooth.

Having now described our invention in connection with a particularly illustrated embodiment thereof it will be apparent that variations and modifications of our invention may now occur from time to time to those persons normally skilled in the art without departing from the essential scope or spirit of the invention, and accordingly it is intended to claim the same broadly as well as specifically as indicated by the appended claims.

What is claimed is:

1. In a cutting rule of the general type having an elongated flat body portion with teeth formed along at least one longitudinal edge thereof, the improvement wherein said teeth comprise a series of adjacent asymmetric teeth, each tooth having a tooth tip and first and second tooth side edges, said tooth side edges diverging from one another from the tooth tip to points of intersection with the side edges of the teeth immediately adjacent to and disposed at opposite sides of said each tooth to form tooth crotches at the said points of intersection, said first and second tooth side edges respectively intersecting a datum line at different first and second angles, and the said tips of said series of adjacent asymmetric teeth being disposed along a straight line.

2. A cutting rule teeth structure as defined in claim 1 wherein said first and second tooth side edges are substantially straight and of different lengths.

3. A cutting rule teeth structure as defined in claim 1 wherein said datum line passes through tips of said teeth.

4. A cutting rule teeth structure as defined in claim 1 wherein said datum line passes through the tips of all of said teeth.

5. A cutting rule teeth structure as defined in claim 1 wherein said tooth crotches are all located at substantially equal distances from lines joining the tips of adjacent teeth.

6. A cutting rule teeth structure as defined in claim 1 wherein the depth of said tooth crotches is less than one half the distance between the tips of adjacent teeth.

7. A cutting rule teeth structure as defined in claim 1 wherein the depth of said tooth crotches is substantially one fifth the distance between the tips of adjacent teeth.

8. A cutting rule teeth structure as defined in claim 1 wherein the crotch between each adjacent pair of teeth is located longitudinally closer to one adjacent tip than to the other adjacent tooth tips.

9. A cutting rule teeth structure as defined in claim 1 wherein the crotch between each adjacent pair of teeth is located longitudinally between the adjacent tooth tips at a point from one of said tooth tips which is substantially one third of the tip-to-tip distance.

10. A cutting rule teeth structure as defined in claim 1 wherein said datum line passes through the tips of substantially all of said teeth, wherein said first and second tooth side edges are substantially straight and of different lengths and intersect said datum line respectively at angles of substantially 18° and 34°.

11. A cutting rule as defined in claim 1 wherein the teeth are cut along a longitudinal edge at an angle of substantially thirty degrees transversely to the plane of the cutting rule.

12. A cutting rule teeth structure as defined in claim 6 wherein the crotch between each adjacent pair of teeth is located longitudinally closer to one adjacent tooth tip than to the other adjacent tooth tips.

13. A cutting rule teeth structure as defined in claim 7 wherein the crotch between each adjacent pair of teeth is located longitudinally between the adjacent tooth tips at a point from one of said tooth tips which is substantially one third of the tip-to-tip distance.

14. A cutting rule teeth structure as defined in claim 13 wherein said datum line passes through the tips of substantially all of said teeth, wherein said first and second tooth side edges are substantially straight and of different lengths and intersect said datum line respectively at angles of substantially 18° and 34°.

15. In a cutting rule of the general type having an elongated flat body portion with teeth formed along at least one longitudinal edge thereof, the improvement wherein said teeth comprise a continuous unbroken row of identical adjacent asymmetric teeth, each tooth having a tooth tip and longer and shorter straight sided tooth edges which diverge from the tooth tip to points of intersection respectively with the shorter and longer side edges of the adjacent teeth to form tooth crotches at said intersections, said longer and shorter tooth side edges respectively intersecting a datum line at different first and second angles, said datum line being tangent to the tips of all of said teeth and said tooth crotches being all located at the same distance from said datum line to thereby define crotches of equal depth, the depth of said tooth crotches being less than half the distance between the tips of adjacent teeth, and each crotch being located longitudinally closer to one adjacent tooth tip than to the other adjacent tooth tip.

16. A cutting rule as defined in claim 15 wherein the depth of said tooth crotches is substantially one fifth the distance between the tips of adjacent teeth and wherein said crotch is located longitudinally between the adjacent tooth tips at a point from one of said tooth tips which is substantially one third of the tip-to-tip distance.

17. A cutting rule as defined in claim 15 wherein the teeth are cut along a longitudinal edge at an angle of substantially 30° transversely to the plane of the cutting rule.

18. A cutting rule as defined in claim 16 wherein one longitudinal face of the entire array of teeth is provided with a very shallow bevel and wherein the opposite longitudinal face of the entire array of teeth is provided with a steeper bevel.

19. A cutting rule as defined in claim 16 wherein the teeth are cut along a longitudinal edge at an angle of substantially thirty degrees transversely to the plane of the cutting rule, and wherein said first and second angles at which said longer and shorter tooth sides intersect said datum line are respectively substantially 18° and 34°.

20. In a cutting rule of the general type having an elongated flat body portion with teeth formed along at least one longitudinal edge thereof, the improvement wherein said teeth comprise a series of adjacent teeth, each tooth having a tooth tip and first and second tooth side edges, said tooth side edges diverging from one another from the tooth tip to points of intersection with the side edges of the teeth immediately adjacent to and disposed at opposite sides of said each tooth to form tooth crotches at the said points of intersection, the depth of said tooth crotches being less than one half the distance between the tips of adjacent teeth.

21. A cutting rule teeth structure as defined in claim 20 wherein the depth of said tooth crotches is substantially one-fifth the distance between the tips of adjacent teeth.

* * * * *